Dec. 16, 1969     R. M. GREEN     3,483,635
TRAINING APPARATUS AND METHOD
Filed Nov. 13, 1968
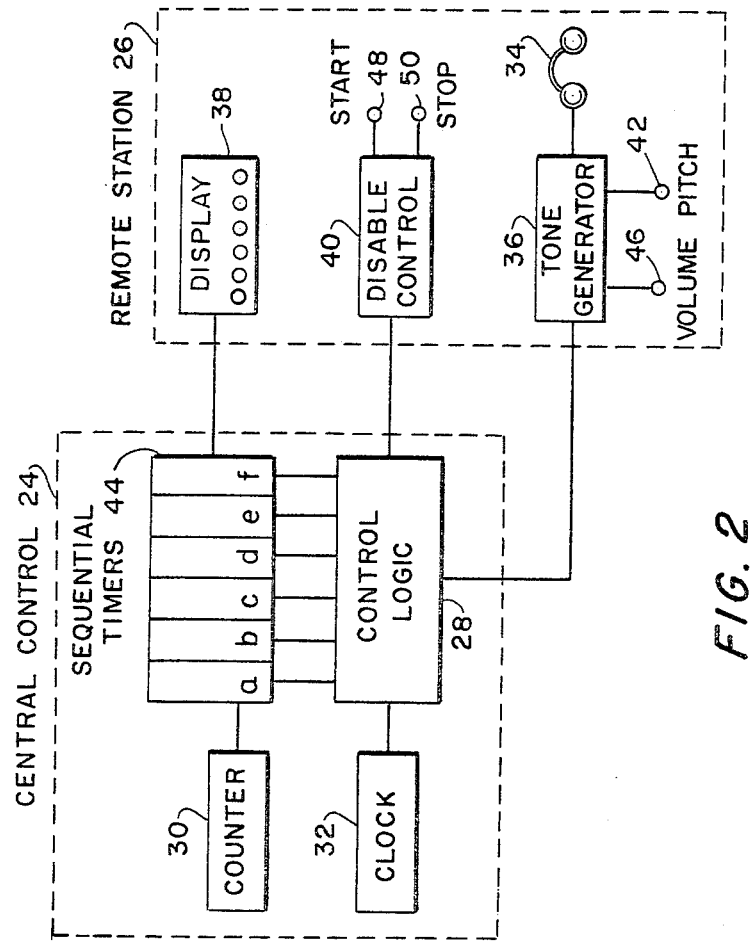
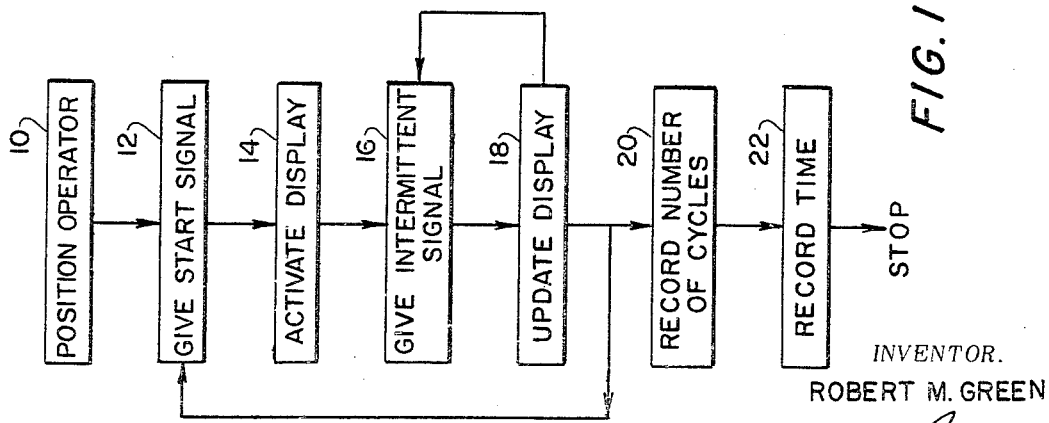
INVENTOR.
ROBERT M. GREEN
BY *Amster & Rothstein*
ATTORNEYS

3,483,635
TRAINING APPARATUS AND METHOD

Robert M. Green, Syosset, N.Y., assignor, by mesne assignments, to Industrial Teaching Systems Corp., New York, N.Y., a corporation of New York
Filed Nov. 13, 1968, Ser. No. 775,352
Int. Cl. G09b 5/04, 19/24
U.S. Cl. 35—13                    8 Claims

ABSTRACT OF THE DISCLOSURE

A trainee is taught to perform a repetitive work cycle more efficiently by a teaching method which includes drilling in the presence of a work-pacing device. The device preferably provides audio signals in a predetermined time relation defining time periods for performing each element of the task. The time periods are preselected in accordance with the trainee's present performance so as to create an incentive to better achievement and to acknowledge improvement and may be adjusted as the trainee improves.

---

This invention relates generally to programmed instruction and more specifically to a method and apparatus for improving performance of a repetitive task.

Numerous industrial situations require a worker to perform a repetitive work task. It has been found that in performing such a task, proper work rhythm is an important prerequisite for accurate and efficient work performance. In many situations, the task is inherently paced by a production line wherein the worker must function in relation to precycled equipment or to the flow of materials. However, in numerous industrial situations, each worker is positioned at a relatively independent work station where the work flow is regulated solely by the operator. In such situations, it is particularly difficult for a new or inexperienced worker to develop and maintain a proper work rhythm and to work at an efficient pace unless such rhythm or work pace is specifically taught.

In order to train a worker to develop a better work rhythm and to provide adequate incentive and acknowledgement of accomplishment, it is not sufficient to pace the overall work operation. To improve rhythm the significant individual steps of the operation must be isolated and the trainee must be taught to perform these steps in proper time relation. In addition, some steps in a work cycle are inherently easier than others and can be learned more quickly. A trainee should be motivated to learn the easy steps quickly and permitted to learn the harder steps more slowly. To this end, the trainee is preferably drilled in the paced performance of the task, with the preferred pace initially being established in accordance with the workers initial capability. As the trainee improves, the preferred pace should be adjusted so as to provide sufficient incentive to improvement and recognition of accomplishment. In the past too little attention has been given to this type of worker training by reinforced learning and the development of proper work pace has been grossly neglected.

It is thus an object of the present invention to train a worker to perform a repetitive task efficiently and effectively by establishing a preferred pace for accomplishing the various elements of the task, the established pace being related to the trainee's current level of proficiency It is a further object of the present invention to reduce the cost and time required to train or retrain production personnel in the paced performance of a repetitive task.

In accomplishing these and other objects in accordance with an illustrative embodiment demonstrating the objects and features of the invention, a worker is trained more effectively to perform a repetitive task by performing the task in the presence of an electronic pacer which generates signals in predetermined time relation defining proper time intervals for the performance of the various elements of the job.

The task is first divided into several work elements and a suitable time period for performing each element is established. Initially the time periods are derived from the trainee's current level of performance and are established so as to provide an incentive and to reinforce the learning process by permitting accomplishment of established objectives. In a preferred embodiment of the invention, the established time for each work element may be the trainee's current average performance time.

The trainee is then equipped with a pacer preferably of a type to be described below, at an actual or simulated work station. Initially, a signal is generated by the pacing device indicating that the trainee should begin the first element of the task. As the trainee works, the pacer generates intermittent signals, preferably audible, defining predetermined intervals corresponding to the preferred duration of each element of the task. Simultaneously, a display indicates the sequential element currently in progress so that the instructor may monitor the trainee's performance from a distance. The trainee should be instructed not to proceed to the next work element until the signal is given. If the trainee must interrupt the task at any stage, he may stop the pacer which will automatically recycle for the next work cycle.

Preferred apparatus for providing such instruction includes a central control unit and a remote station unit. The control unit includes a plurality of sequential timing devices and signal generating means for repeatedly generating a plurality of signals in a predetermined time relation. The signals define predetermined time intervals related to the preferred time for performing each of the work elements in a work cycle. The central control unit is preferably provided with first timing means operative whenever power is applied to the control device, and with second timing means operative whenever the sequential timing devices are functioning. The remote station is positioned adjacent to the trainee and is interconnected with the central control unit. It is adapted to produce an audio signal in response to the signals from the central control. The remote unit may be equipped with a plurality of sequential lights or other visual display means which indicate which element of the task is in progress. Additionally, each remote unit includes disabling means operable by the trainee to interrupt the audio signals and deactivate the display means.

The above brief description, as well as further objects, features and advantages of the present invention will be more fully appreciated by reference to the following detailed description of an illustrative embodiment in accordance with the invention, taken in conjunction with the accompanying drawings, wherein:

FIG. 1 is a diagrammatic representation of a teaching process in accordance with the invention; and FIG. 2 is a block diagram of preferred apparatus constructed in accordance with the invention for use in teaching a repetitive task.

The teaching process outlined in FIG. 1 is designed in accordance with the invention to train an industrial worker to perform a repetitive task efficiently. Efficient performance of such a task requires that the worker develop a consistent and appropriate pace or work rhythm consonant with his skill. Such rhythm increases the worker's accuracy and stamina and thus permits the worker to operate more effectively with less apparent effort. Developing such pace is difficult, particularly for a new and relatively inexperienced employee.

Proper pace is best learned by drilling the trainee in the proper performance of the task. In drilling proper rhythm it is essential that work goals be initially established which are within the trainees initial capability. As the trainee develops skill, the desired rhythm should be adjusted accordingly until a pace consonant with the individual trainee's skill and effort capabilities is established.

Before conducting a drill, the task or work cycle must be analyzed to determine the individual sequential work elements involved. Such analysis is required because proper pace contemplates that elements of the work cycle be performed in proper time relation and because certain elements are inherently easier than others and can be learned more quickly.

Preferably the task should be further analyzed before the training exercise begins so as to determine the most efficient method of performance. The procedure employed for determining such methods are well known in the field of industrial engineering and time study and need not be described in detail here. However, it is to be understood that such further analysis is optional and that the method may be performed in the absence of such analysis. Suffice it to say that the element times should not be so short as to produce time adjacent signals which would confuse the opertor but must not be so long as to provide insufficient pacing.

The time established for each element of the work cycle should be related to the trainee's current level of performance. It should be short enough so as to provide the individual trainee with an incentive to improve each element, but long enough to present an attainable goal. The trainee should be instructed not to proceed to the next work element until the time for the prior element has elapsed. In this way the learning process is reinforced because the trainee is in effect advised each time he completes an element early and waits that he has achieved his objective. In a preferred embodiment of the invention, the initial time for each element may be the individual trainees average time as empirically determined before the test begins. It should be noted that many of the complexities of traditional time study can be avoided by using the present process which requires only that raw element time be determined.

In conducting drill in accordance with the invention, the trainee must be advised when the element in progress should be completed. These indications must not be provided in so distracting a manner as to interfere with the trainees concentration on the work he is doing. In accordance with the invention, these indications are provided by giving an intermittent signal, preferably an audio signal, at the end of the elapsed time period for each work element. This may be augmented by displaying a continuous indication of the work element currently in progress so as to aid the instructor in reviewing the training program.

As shown in the process flow diagram in FIG. 1, the operator is first positioned (10) at an actual work station or at a simulated station forming a part of a separate training facility. The trainee should be positioned with respect to the equipment and materials employed so as to simplify the motions required to perform the task.

The trainee is then given a start signal (12) which will preferably be a short audio signal and which may be provided through a small earphone so as not to disturb other workers or trainees. Immediately after the start signal is given, a visual display is activated (14) to indicate to the instructor that the trainee should be working on the first element of the work cycle. This display is preferably an array of sequentially activated lights to be more fully described hereinafter.

At the end of the elapsed time for the first work element, a second intermittent audio signal is given (16) to advise the trainee that the first work element should be completed. Immediately thereafter or simultaneously therewith the visual display is updated (18) so as to indicate that the employee should be performing the second work element.

At the conclusion of the time allotted for the second work element, a third intermittent audio signal is provided which terminates the second work element and the display is accordingly updated. The process continues in this loop with intermittent signals being given at the termination of the time established for each work element and the display being intermittently updated.

After the time for the last element is completed, the start signal is again given, indicating that the trainee should repeat the entire work cycle, and the process continues with intermittent audio signals (16) and an intermittently updated display (18) until the desired training period is terminated.

In a preferred embodiment of the invention, each step of the process between the giving of the start signal (12) and termination of the exercise (20) includes the additional step of interrupting the display and signaling sequence under control of the trainee. When such interruption occurs, the process is recycled to the start signal, 12 in FIG. 1, after a chosen period of delay. This manual disabling feature permits the trainee to interrupt any work cycle if he falls too far behind or if a break in the work is required for any other reason. The extent of such interruption can be determined from the recorded number of complete cycles (20) and the elapsed training time (22). This data assists the instructor in evaluating the results of the training session and the progress of the trainee.

At the termination of the desired training period, the number of cycles completed by the employee is recorded (20) and the total elapsed time for the training period is recorded (22). This is preferably done with a running counter and a running clock to be described in detail below.

By analyzing this data and by observing the trainee during the course of the exercise, the instructor can determine whether the trainee has shown improvement in the performance of the task. Specifically, the instructor should determine whether the trainee has improved the time in which he performs each element of the work cycle. Where sufficient improvement is shown, the time for that element should be decreased slightly to create additional incentive during the next pacing session. At the next session the process is again repeated with the new element times which are again reviewed before the third session. Over a period of weeks during which the trainee works with the pacing method for approximately an hour a day this process has been found to produce substantial improvement in operator performance.

As an example of the type of repetitive task to which the training process is most advantageously applicable, a simple sewing process for assembling men's collars will be described below and a sample element time breakdown, not intended to necessarily be representative of the time actually required of any trainee, will be given.

Description

Pick up two plies of collars, face to face with left hand. With right hand pick up lining. Position collars and lining together and position under sewing machine foot. Sew across first end, pull piece from behind machine, reposition at needle. Reach to 2nd end of collar with both hands, grasp and align. Sew across back of collar and off second end. Pull piece from behind machine and reposition at needle, sew across 2nd end.

ELEMENT BREAKDOWN

| Element No. | Work performed | Element time (min.) |
|---|---|---|
| 1 | Pick up collars (face to face) and lining, position together and position under foot. | .060 |
| 2 | Sew across 1st end—pull piece, reposition at needle. | .042 |
| 3 | Reach to 2nd end of collar and align | .031 |
| 4 | Sew across back of collar | .026 |
| 5 | Pull piece, reposition at needle and sew acros 2nd end. | .045 |
| | Cycle | .204 |

In a normal sequence of operation, the above times might have been determined by measuring the average actual time required by the individual trainee. Initially these times would be employed in the first training session. During the training drill the instructor would watch the trainee and determine whether the trainee's time for accomplishing any one or more of the individual elements had improved. If so, the times should be readjusted either during this exercise or before the next exercise and the process repeated.

Preferred apparatus for carrying out the process described is shown in FIG. 2. Generally, this apparatus is designed to provide the intermittent audio signals and continuous display required for performing the method. The apparatus preferably includes a central control unit 24 and a remote station unit 26. Basically, the central unit provides all necessary control functions and the remote unit communicates the appropriate signals to the trainee.

It should also be noted that the various components of the system represented by blocks in FIG. 2 are all conventional electronic or electro-mechanical apparatus which are designed with state of the art components and will thus not be described in detail.

Control unit 24 includes the basic control logic 28 of the system. This device is interconnected with a plurality of sequential timers 44a through 44f which provide the essential timing function of the system. Each such timer may be independently adjusted within a range, for example, of $1/100$ to $99/100$ of a minute. These timers are preset before the start of the training session to the desired time intervals determined as described above, with each individual timer being set to correspond to the desired time for each element of the work cycle. Six such timers are shown in FIG. 2, however it is to be understood that any number of timers may be employed. Additionally, the control logic unit 28 may include circuitry for eliminating one or more of the six timers from the active circuit when the task being timed includes fewer than six sequential elements.

The number of cycles completed are continuously recorded by an appropriate counter 30 so that at the end of the training period the instructor need merely glance at the control panel and record the cycle number. The control unit preferably also includes a clock 32 which indicates the total time during which the exercise has been in progress. The time and cycle information this provides assists the instructor in evaluating the progress of the trainee and the results of the exercise.

The remote unit 26 includes a tone generator 36 and an electro-acoustic transducer 34 which together provide the requisite audio tone in response to timed signals from control 24. Preferably the trainee is provided with pitch 42 and volume 46 controls to adjust the various signals to his individual comfort. The remote unit further includes a display 38 which continually indicates to the instructor the work element currently in progress. This display is preferably an array of sequentially activated lamps, one lamp indicating that the trainee should be engaged on the first work element, two the second, and so forth. This display permits the instructor to check the step in progress quickly and from a distance and permits the instructor to time the operator's performance of individual work elements.

Each trainee is additionally provided with a disable control 40 including a start switch 48 and a stop switch 50 by means of which he may interrupt the flow of intermittent audio signals and deactivate the display. The start preferably includes a two second delay to permit the operator to position himself before the first cycle begins. Thus if a trainee desires to break the work cycle at any point or if the trainee requires a break at the end of a work cycle, the disable control would be employed by pressing the stop switch 50. The disable control preferably does not interrupt the operation of clock 32 so that the cumulative duration of the break taken can be appropriately recorded and evaluated. In a preferred embodiment of the invention the disable control automatically recycles the equipment to the beginning of the first work element. Thus if a trainee falls behind the established pace, he may always stop the pacer, complete the work without pacing and then begin the next cycle when he is ready.

A typical training session employing the method and apparatus described above is preceded by analysis of the work procedure to insure that the method being taught is efficient. Trainee is timed in the performance of several work cycles and the average time for the performance of each element is computed. Next the sequential timers 44 associated with the central control unit 24 are set with each sequential timer corresponding to one of the preferred sequential element times. The trainee is then positioned at a work station, and the pacing apparatus is activated, thus starting the clock 32 associated with the central unit. After a brief preset delay, the control unit generates an electrical signal which is communicated to the remote station tone generator 36 and transducer 34 which produces a short audio signal advising the trainee to start the first work cycle. Simultaneously, the first bulb on the remote display unit 38 is lighted indicating to the instructor that the first work element should be in progress.

At the expiration of the time for the first element, the control generates a second signal which is communicated to the remote unit which in turn produces a second audio signal and illuminates the second sequential bulb. The control unit continues to send control signals to the remote station, which generates a short audio signal at the expiration of each preset element time and illuminates an additional bulb. At the end of the first complete work cycle, the counter 30 is advanced one unit, the display lamps 38 are extinguished, and the process repeats.

If, during the course of the session, the trainee falls behind or desires to interrupt the work sequence, he merely presses the stop switch 50 on the remote unit which terminates the audio signals and turns off all bulbs on the display. When he has completed work on the piece in progress and is ready to start a new cycle, he merely presses the start switch 48. After a two second delay, the remote unit gives a start signal and the process continues as before.

During the course of the training session, the instructor observes the trainee and times his performance of the various elements of the work cycle. If the trainee has improved his time for one or more of the elements, the counter associated with that element is adjusted so that the pacer continues to provide incentive and reinforcement as described above.

It is to be understood that the embodiments described above are merely examples of the application of the principle of the invention. Additional embodiments may be devised by those skilled in the art without departing from the spirit or scope of the invention.

What is claimed is:

1. A method for teaching a trainee to perform a work cycle having a plurality of distinct sequential elements each of which is initially performed by the trainee in an element time interval related to the current level of proficiency of the trainee comprising the steps of:
    (a) measuring the element time interval required by the trainee to perform each of the distinct sequential elements,
    (b) instructing the trainee not to proceed from one element of the job to another until signaled to do so,
    (c) generating a brief audio signal at the start of each work cycle and at the end of a preselected elapsed time for each of said distinct sequential elements of said work cycle, each of said pre-selected elapsed times being related to a corresponding one of said measured element time intervals, each of said audio signals indicating to the trainee that the current sequential element should be completed and that he may proceed to the next sequential element,
    (d) repeating step (c) for a selected period of time,
    (e) after said selected period of time, remeasuring the element time interval required by the operator to perform each of said distinct sequential elements, and
    (f) repeating step (c), said pre-selected elapsed times each being individualy re-selected in accordance with said re-measured element time intervals so as to reduce the time alotted for the performance of elements in which the trainee's performance has improved without affecting the time allotted for other elements.

2. A method as defined in claim 1 further including the step of:
    (g) displaying a visual indication of the sequential element the trainee should be performing, said indication persisting substantially throughout the period allotted for performance of each element and being updated on the occurrence of each of said intermittent signals.

3. A method for timed operator training as defined in claim 2 further including the step of:
    (h) selectively disabling said intermittent signals and said continuous display under control of said trainee.

4. A method for timed operator training as defined in claim 3 further including the step of:
    (i) counting the number of completed work cycles performed by the trainee in a selected time period.

5. A method for timed operator training as defined in claim 4 wherein step (g) comprises the step of serially illuminating a plurality of sequential indicator lights; and wherein step (h) comprises the step of illuminating an additional one of said indicator lights.

6. A method for teaching a worker to perform a repetitive job having a plurality of distinct sequential steps using a pacing device including a plurality of sequential timers adapted to generate intermittent audio signals and a visual display, said method comprising the steps of
    (a) making at least one measurement of the time actually required by the trainee to perform each step of the job,
    (b) setting said sequential timers to generate brief audio signals at the start of each repetition of the job and at the end of a selected time period for each of said distinct sequential steps of the job, said selected time periods being computed in accordance with said at least one measurement of the time actually required to perform the corresponding step,
    (c) instructing the trainee not to proceed from one step of the job to the next until the time allotted for said step is completed,
    (d) actuating said pacing device and maintaining it in operation for a selected training time during which successive pairs of said brief audio signals indicate to the trainee the time allotted for completion of each step of the job and said display provides a continuous indication of the sequential step the trainee should be performing, said trainee having the ability to interrupt said pacing device at any time throughout said training time,
    (e) at the end of said training time, making at least one new measurement of the time required by the trainee to perform each step of the job, and
    (f) re-setting said sequential timers to individually adjust said selected elapsed times so as to reduce the time allotted for the performance of elements in which the trainee has improved without affecting the time allotted for the performance of other elements,
    (g) repeating steps (d) through (f) until training is completed.

7. Apparatus for training a worker to perform a repetitive work cycle having a plurality of sequential work elements, said apparatus comprising sequential timers for generating intermittent signals in selected time relation defining individual time periods of selected length related to the time required by said trainee to perform each of said elements, electro-acoustic transducer means for generating brief audio signals in response to said intermittent signals, successive pairs of said audio signals defining said individual time periods of selected length, means for displaying a continuous visual indication of the sequential work element the trainee should be performing, said indication persisting substantially throughout the time allotted for performance of said sequential work elements, and means under control of said trainee for disabling said intermittent signals and said display.

8. An electronic pacer for training an operator to perform a repetitive work cycle having a plurality of sequential work elements each of which is preferably to be performed in a pre-determined time interval related to the actual time required by said operator to perform each of said sequential work elements, said pacer comprising a central control unit including sequential timers each of which may be individually pre-set for generating a plurality of electrical signals in timed relation, said signals defining time periods which correspond to said pre-determined time intervals, means for recording the number of times said work cycle is completed by said timers, clock means for indicating the time said pacer is in operation; at least one remote station unit interconnected with said control unit, said station unit including transducer means for generating a signal in response to said electrical signals, and disabling means under control of said trainee for interrupting the flow of electrical signals from said control unit without disabling said clock means; and display means for identifying the work cycle the trainee should be performing.

References Cited

UNITED STATES PATENTS

| | | | |
|---|---|---|---|
| 3,154,865 | 11/1964 | Conner | 35—13 |
| 2,348,744 | 5/1944 | McMurry | 35—5 |
| 3,121,960 | 2/1964 | Uttal et al. | 35—9 |
| 3,270,438 | 9/1966 | Ephraim | 35—5 |

EUGENE R. CAPOZIO, Primary Examiner

W. W. NIELSEN, Assistant Examiner